United States Patent [19]
Tan et al.

[11] Patent Number: 5,906,674
[45] Date of Patent: May 25, 1999

[54] PROCESS AND APPARATUS FOR SEPARATING GAS MIXTURES

[75] Inventors: Ziming Tan, Basking Ridge; Karl O. Toppel, Flemington, both of N.J.

[73] Assignee: The BOC Group, Inc., New Providence, N.J.

[21] Appl. No.: 08/991,161

[22] Filed: Dec. 16, 1997

[51] Int. Cl.⁶ .......................... B01D 53/04; B01D 53/047
[52] U.S. Cl. ................................ 95/98; 95/101; 95/102; 95/105; 95/106; 95/115; 95/130; 95/138; 96/130; 96/144
[58] Field of Search ............................ 95/97–106, 130, 95/138, 114, 115; 96/130, 144

[56] References Cited

U.S. PATENT DOCUMENTS

| | | | |
|---|---|---|---|
| 3,176,444 | 4/1965 | Kiyonaga | 95/97 X |
| 3,221,476 | 12/1965 | Meyer | 95/97 |
| 3,226,914 | 1/1966 | Griesmer et al. | 95/98 |
| 3,237,377 | 3/1966 | Skarstrom | 95/97 |
| 3,923,477 | 12/1975 | Armond et al. | 95/130 X |
| 4,233,038 | 11/1980 | Tao | 95/104 |
| 4,259,091 | 3/1981 | Benkmann | 95/98 |
| 4,263,018 | 4/1981 | McCombs et al. | 95/98 X |
| 4,381,189 | 4/1983 | Fuderer | 95/100 |
| 4,439,213 | 3/1984 | Frey et al. | 95/98 |
| 4,543,109 | 9/1985 | Hamlin et al. | 95/130 X |
| 4,685,939 | 8/1987 | Kratz et al. | 95/100 |
| 5,090,973 | 2/1992 | Jain | 95/99 |
| 5,110,569 | 5/1992 | Jain | 95/97 X |
| 5,156,657 | 10/1992 | Jain et al. | 95/101 |
| 5,232,474 | 8/1993 | Jain | 95/97 |
| 5,425,240 | 6/1995 | Jain et al. | 95/106 X |
| 5,429,663 | 7/1995 | Cassidy et al. | 95/97 X |
| 5,571,309 | 11/1996 | Kumar | 95/99 |
| 5,779,768 | 7/1998 | Anand et al. | 95/99 |

FOREIGN PATENT DOCUMENTS

| | | | |
|---|---|---|---|
| 0219103 | 4/1987 | European Pat. Off. | 95/97 |

*Primary Examiner*—Robert Spitzer
*Attorney, Agent, or Firm*—Coleman R. Reap; Salvatore P. Pace

[57] ABSTRACT

A process for separating oxygen and nitrogen using an adsorption system comprising at least one main adsorption vessel containing an adsorbent selective for one component and at least one auxiliary adsorption vessel containing an adsorbent selective for the same component, the auxiliary vessel(s) being operated under conditions which result in the production of a product gas of lower purity than the product gas from the main adsorption vessel(s). The lower purity product gas from the auxiliary vessel is used to purge or pressurize the main adsorption vessel(s).

24 Claims, 1 Drawing Sheet

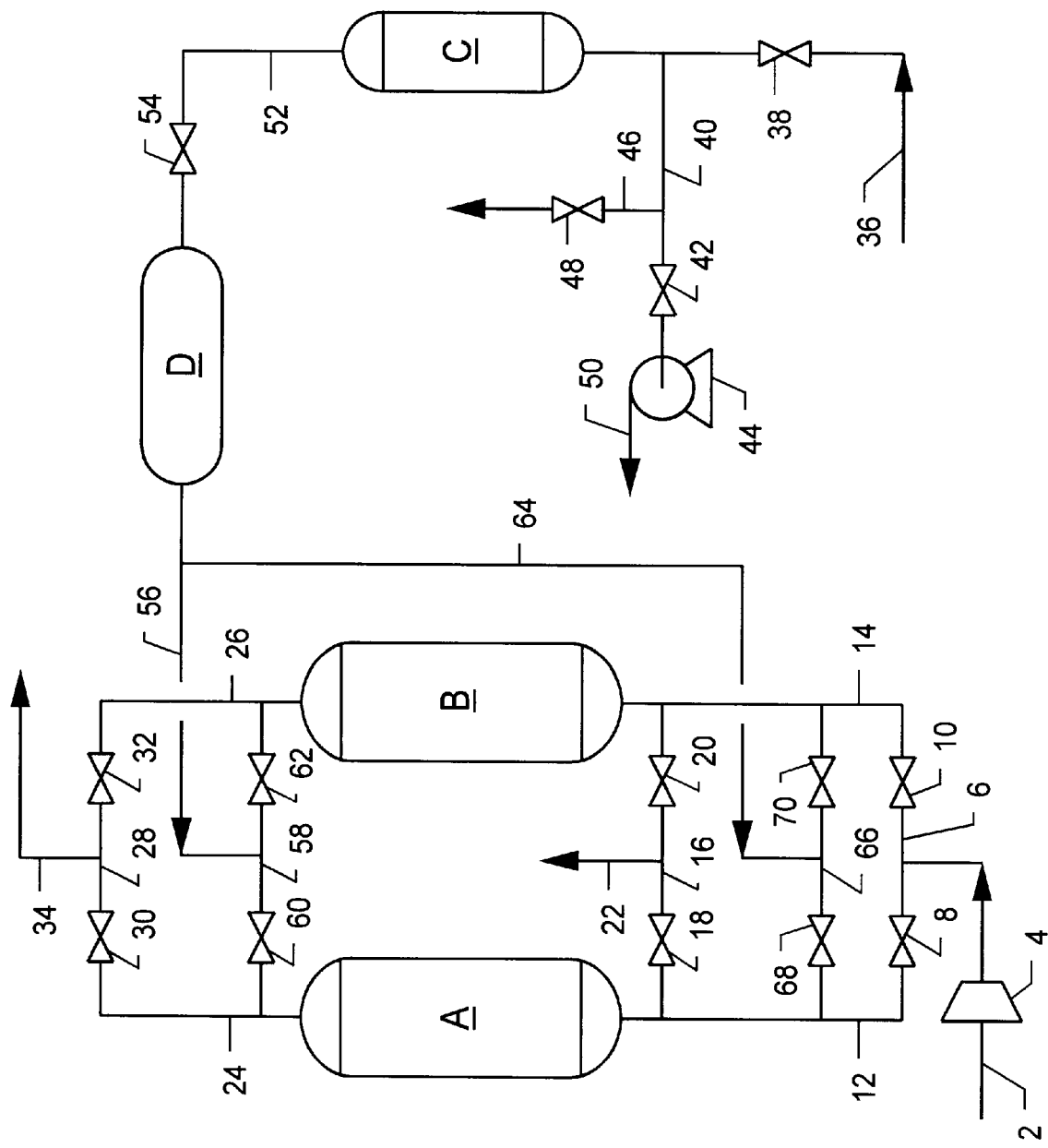

PROCESS AND APPARATUS FOR SEPARATING GAS MIXTURES

FIELD OF THE INVENTION

This invention relates to a process for separating the components of a gas stream, and more particularly to a cyclic adsorption process for separating oxygen from nitrogen. Specifically, the invention concerns a cyclic adsorption process, e.g. pressure swing adsorption (PSA) or temperature swing adsorption (TSA), carried out in a system comprising at least one main adsorption vessel and at least one auxiliary adsorption vessel, the adsorption process carried out in the main adsorption vessel(s) having a purge step for which the purge gas is provided by a PSA process carried out in the auxiliary adsorption vessel(s).

BACKGROUND OF THE INVENTION

Cyclic adsorption processes are frequently used to separate the components of a gas mixture. Typically, cyclic adsorption processes are conducted in one or more adsorbent vessels that are packed with a particulate adsorbent material which adsorbs at least one gaseous component of the gas mixture more strongly than it adsorbs at least one other component of the mixture. The adsorption process comprises repeatedly performing a series of steps, the specific steps of the sequence depending upon the particular cyclic adsorption process being carried out. For example, PSA processes generally comprise a series of steps that includes pressurization of the adsorbent-containing vessel to the desired adsorption pressure, production of purified gas by passing feed gas through the adsorption vessel at the desired adsorption pressure and regeneration of the adsorbent when the concentration of adsorbed component(s) in the adsorbent reaches a certain level.

The procedure followed for regenerating the adsorbent varies according to the process. In PSA processes the adsorbent is at least partially regenerated by reducing the pressure in the adsorption vessel, thereby causing adsorbed component to be desorbed from the adsorbent, whereas in (TSA) processes the adsorbent is regenerated by heating it, thereby causing the adsorbed component to be desorbed. In either case, the regeneration process usually includes a purge step during which a gas stream that is depleted in the component to be desorbed is passed countercurrently through the bed of adsorbent, thereby reducing the partial pressure of adsorbed component in the adsorption vessel, which causes additional adsorbed component to be desorbed from the adsorbent. The nonadsorbed gas product is generally used to purge the adsorbent beds, since this gas is usually quite depleted in the adsorbed component of the feed gas mixture. It often requires a very considerable quantity of purge gas to adequately regenerate the adsorbent. For example, it is not unusual to use half of the nonadsorbed product gas produced during the previous production step to restore the adsorbent to the desired extent.

It can be appreciated that using such large quantities of nonadsorbed product gas to regenerate the adsorbent detracts considerably from the efficiency of the adsorption process. Process modifications which increase the efficiency of adsorption processes are continually sought. This invention provides a process modification which significantly increases the net production of nonadsorbed product gas in PSA and TSA processes.

SUMMARY OF THE INVENTION

According to one broad embodiment, the invention comprises a method of separating a first gaseous component from a gas mixture comprising said first gaseous component and a second gaseous component comprising the steps:

(a) subjecting the gas mixture to a cyclic adsorption process which includes adsorption and adsorbent regeneration substeps in one or more main adsorption vessels containing adsorbent which selectively adsorbs the second gas component of the gas mixture, thereby producing a primary first component-enriched gas product;

(b) subjecting the same gas mixture to a pressure swing adsorption process which includes adsorption and adsorbent regeneration substeps in one or more auxiliary adsorption vessels containing an adsorbent which selectively adsorbs the second gas component, thereby producing a secondary first component-enriched gas product, the pressure swing adsorption process being carried out under conditions such that the secondary first component-enriched gas product is of lower purity, at a lower pressure, or of lower purity and at a lower pressure than the primary first component-enriched gas product, and (c) passing the secondary first component-enriched gas product into the one or more main adsorption vessels as a purge gas, as a pressurization gas, or as both a purge gas and a pressurization gas.

In a preferred embodiment of the invention, the first component is oxygen and the second component is nitrogen. In one aspect of this embodiment, the secondary first component-enriched gas product comprises about 20 to about 95% oxygen, and in a more preferred aspect, the secondary first component-enriched gas product comprises about 50 to about 75% oxygen. In another preferred embodiment, the first component is nitrogen and the second component is oxygen. Air is the desired feed gas mixture for either of these embodiments.

In a preferred aspect of this embodiment of the invention the secondary first component-enriched gas product is of lower purity than the primary first component-enriched gas product.

In one version of this embodiment, the cyclic adsorption process of step (a) is pressure swing adsorption. In another version of this embodiment, the cyclic adsorption process is temperature swing adsorption.

In one preferred embodiment of the invention, the secondary first component-enriched gas is passed countercurrently through said at least one main adsorption vessel as a purge gas, and in another preferred embodiment, the secondary first component-enriched gas is introduced countercurrently into said at least one main adsorption vessel as a pressurization gas.

The adsorbent in the one or more main adsorption vessels and the adsorbent in the one or more auxiliary adsorption vessels are preferably selected from lithium-exchanged type X zeolite, sodium-exchanged type X zeolite, calcium-exchanged type X zeolite, calcium-exchanged type A zeolite and mixtures of these. Preferably, the adsorbent in the one or more than one main adsorption vessels is different from the adsorbent in the one or more auxiliary adsorption vessels. Preferably, the adsorbent in the one or more main adsorption vessels is lithium-exchanged type X zeolite. Preferably, the adsorbent in the one or more auxiliary adsorption vessels is sodium-exchanged type X zeolite, calcium-exchanged type X zeolite, calcium-exchanged type A zeolite or a mixture of these.

When oxygen is to be adsorbed from the gas mixture, an oxygen-selective adsorbent will be used in the main and auxiliary adsorption vessels. The preferred oxygen-selective adsorbent is carbon molecular sieve.

In a preferred aspect of the invention, the adsorption carried out in step (a) is at least partly conducted at a pressure in the range of about 1 to about 20 bara. More preferably, the adsorption in step (a) is at least partly carried out at a pressure in the range of about 1 to about 5 bara. In a preferred aspect of the invention, the adsorption carried out in step (b) is at least partly conducted at a pressure in the range of about 0.1 to about 5 bara, and is more preferably at least partly conducted at a pressure in the range of about 0.15 to about 2 bara.

According to another broad embodiment, the invention comprises apparatus for separating air by a pressure swing adsorption process comprising:

(a) one or more main adsorption vessels having an inlet end and a nonadsorbed product outlet end containing a zeolite selected from lithium-exchanged type X zeolite, calcium-exchanged type X zeolite, calcium-exchanged type A zeolite, sodium-exchanged type X zeolite and mixtures of these;

(b) one or more auxiliary adsorption vessels having an inlet end and a nonadsorbed product outlet end containing a zeolite selected from lithium-exchanged type X zeolite, calcium-exchanged type X zeolite, calcium-exchanged type A zeolite, sodium-exchanged type X zeolite and mixtures of these, the adsorbent in the main adsorption vessels being different from the adsorbent in the auxiliary vessels;

(c) means for introducing air into the main adsorption vessel(s) at their inlet ends;

(e) means for introducing air into the auxiliary adsorption vessel(s) at their inlet ends at a lower pressure than the air being introduced into the main adsorption vessel(s);

(f) means for withdrawing oxygen-enriched product gas from the main adsorption vessel(s) at their nonadsorbed outlet ends;

(g) means for withdrawing oxygen-enriched product gas from the auxiliary adsorption vessel(s) at their nonadsorbed product ends and introducing such oxygen-enriched product gas into the main adsorption vessel at their nonadsorbed product ends as purge gas; and (h) means for withdrawing desorbed nitrogen-enriched gas mixture from the main adsorption vessel(s) at their inlet ends.

In a preferred aspect of this embodiment of the invention, the means for introducing air into the auxiliary adsorption vessel(s) provides air at a pressure lower than the pressure of the air provided by the means for introducing air into the main adsorption vessel(s).

BRIEF DESCRIPTION OF THE DRAWINGS

The drawing FIGURE is a schematic representation of one embodiment of an adsorption system in which the process of the invention can be carried out.

DETAILED DESCRIPTION OF THE INVENTION

The invention is a method for separating gas by cyclic adsorption which increases the volume of purified gas produced in an adsorption plant and/or results in a reduction of the cost of operating the adsorption plant. As noted above, the use of nonadsorbed product gas to purge or repressurize adsorption vessels following adsorbent regeneration significantly reduces the net quantity of nonadsorbed product gas made during production steps. Such nonadsorbed product loss is avoided by practice of the present invention, which does not use nonadsorbed product gas from the main adsorption vessels of an adsorption system to purge and/or repressurize adsorption vessels.

In accordance with the invention, feed gas, for example air, is subjected to adsorption in one or more main adsorption vessels. Purging and/or pressurization of the main adsorption vessels is accomplished using the same nonadsorbed gas, but at a lower quality, the lower quality gas being produced in one or more auxiliary adsorption vessels. The term "lower quality gas", as used in this specification, means gas having the same qualitative composition as the nonadsorbed gas produced in the main adsorption vessels of the system, but at a lower pressure, or of lower purity, or both at lower pressure and of lower purity than the nonadsorbed gas produced in the main adsorption vessels. Because the purge/pressurization gas is of lower quality it is less expensive to produce. Overall cost reduction is achieved because the lower quality gas is produced using less effective, but also less expensive adsorbent and/or by producing a lower pressure gas, which provides savings in the form of lower energy cost.

The main and auxiliary adsorption systems used in the invention may each comprise a single adsorption unit or battery of adsorption units operated in phase, or a plurality of adsorption units or batteries of adsorption units operated out of phase, whichever is desired. When a system comprising a single adsorption unit or an "in phase" battery of units is used, the adsorption step must be periodically stopped to permit regeneration of the adsorbent bed(s), whereas when a plurality of adsorption units are employed in parallel and operated out of phase, one or more units can be in adsorption service producing purified sorbate, while one or more other units are undergoing regeneration to release the adsorbed gas component. Operation of the adsorption systems of the invention is cyclical. In the complete adsorption process cycles are repeatedly carried out, so that the process is substantially continuous. In the embodiment of the invention illustrated in the drawing, the main adsorption system comprises a twin bed system comprising a pair of parallel vessels, A and B, each packed with one or more nitrogen-selective adsorbents of the type described below and operated 180° out of phase. The auxiliary adsorption system is illustrated as comprising single adsorption vessel C, operated intermittently, but as indicated above, this system can comprise any of the above-described arrangements. The invention will be described in detail as practiced with the illustrated arrangement, it being understood, however, that the illustrated arrangement is merely exemplary of systems suitable for practicing the process of the invention.

The system is provided with main adsorption vessel feed air inlet line 2, which, in the illustrated embodiment, is optionally provided with feed gas pumping means 4, which may be, for example, a compressor or a blower. Prepurification units, such as condensers, dryers, etc. (not shown), may also be positioned upstream of main adsorption vessels A and B. Line 2 is connected to inlet gas manifold 6, which is provided with valves 8 and 10. Manifold 6 is connected to vessel inlet lines 12 and 14, which, in turn, are connected to the inlets of vessels A and B, respectively. Vent manifold 16, provided with valves 18 and 20, is also joined to lines 12 and 14. Vent line 22 joins manifold 16 at a point between valves 18 and 20.

Nonadsorbed gas discharge lines 24 and 26 are connected to the nonadsorbed gas outlets of vessels A and B, respectively. Lines 24 and 26 are connected to product gas manifold 28, which is provided with valves 30 and 32. At a point between valves 30 and 32 manifold 28 is connected to product line 34.

Auxiliary vessel feed line 36, fitted with valve 38, is connected to the inlet of auxiliary adsorption vessel C. Line 36 is also connected to line 40, which is provided with valve 42 and, in the illustrated embodiment, is connected to the inlet end of optional vacuum pump 44. Line 40 is also connected to vent line 46, which is provided with valve 48. Desorbed gas discharge line 50 is connected to the discharge end of vacuum pump 44. The nonadsorbed gas outlet of vessel C is joined to nonadsorbed product gas line 52, which is provided with valve 54. Line 52 is connected to optional buffer tank D. Purge/repressurization line 56 is also connected to tank D. The downstream end of line 56 is connected to purge gas manifold 58, which communicates with lines 24 and 26 via valves 60 and 62, respectively. Cocurrent pressurization line 64 joins line 56 to manifold 66, which communicates with lines 12 and 14 through valves 68 and 70, respectively.

The adsorbent used in the main and auxiliary adsorption vessels of the system will depend upon the particular gas to be separated from the gas mixture. As noted above, it is the purpose of the invention to reduce the operating costs of adsorption processes; accordingly it is usually preferred to use a less expensive adsorbent in the auxiliary adsorption units than is used in the main adsorption units, if possible. The preferred adsorbents for the adsorption of nitrogen from other gases are discussed above. Oxygen-selective adsorbents include carbon molecular sieve and zeolite 4A, which selectively adsorb oxygen from air under kinetic adsorption conditions.

Although the system and process may be used to separate the components of any gas mixture, it will be described as it applies to the separation of oxygen from an air stream by the adsorption of nitrogen therefrom. The process will be described first with vessel A in the adsorption mode and the adsorbent in vessel B undergoing regeneration (first phase), and then with vessel B is the adsorption mode and the adsorbent in vessel A undergoing regeneration (second phase).

During the first phase of the process, valves 8, 20, 30 and 62 of the main adsorption system are open and all other valves of this part of the system are closed. Air is introduced into the system via line 2. The air may be pressurized, if desired, using optional gas pumping means 4. The air then enters vessel A and passes through the nitrogen-selective adsorbent in this vessel, and as it does so, nitrogen is adsorbed from the air. Oxygen enriched air product of the desired purity exits vessel A through line 24, passes through valve 30 and manifold 28 and exits the system through line 34. Meanwhile, oxygen-enriched air of lower quality (lesser purity and/or at lower pressure) than the oxygen-enriched product gas leaving the system through line 34 is discharged from buffer vessel D, when this vessel is included in the system, or, when vessel D is not included in the system, is discharged directly from vessel C. The oxygen-enriched air passes through line 56, manifold 58 and line 26 and passes countercurrently through vessel B. As this gas passes through the adsorbent in vessel B it desorbs nitrogen from the adsorbent. The desorbed nitrogen leaves the system through line 14, manifold 16 and vent line 22. Line 22 may be vented to the atmosphere or it may be connected to the inlet end of a vacuum pump (not shown).

As the adsorption process proceeds, the adsorbed nitrogen front advances toward the outlet end of vessel A. When it reaches the desired end point, the first phase of the process in the main adsorption system is terminated and the second phase begun.

During the second phase of the process, valves 10, 18, 32 and 60 of the main adsorption system are open and all other valves of this part of the system are closed. Feed air now enters vessel B and passes through the nitrogen-selective adsorbent in this vessel, and as it does so, nitrogen is adsorbed from the air. Oxygen enriched air product of the desired purity exits vessel B through line 26, passes through valve 32 and manifold 28 and exits the system through line 34. Meanwhile, oxygen-enriched air of lower quality than the oxygen-enriched product gas leaving the system through line 34 is discharged from buffer vessel D, passes through line 56, manifold 58 and line 24 and passes countercurrently through vessel A. As this gas passes through the adsorbent in vessel A it desorbs nitrogen from the adsorbent. The desorbed nitrogen leaves the system through line 12, manifold 16 and vent line 22.

As the second phase of the process proceeds, the adsorbed nitrogen front advances toward the outlet end of vessel B. When it reaches the desired end point, the first cycle of the process in the main adsorption system is terminated and the second cycle begins. The second and each subsequent cycle of the process carried out in the main adsorption system is identical to the first cycle, with feed gas and regeneration gas alternately passing through vessels A and B during alternate half-cycles of the process.

In a variation of the above procedure, optionally used when PSA is practiced in vessels A and B, valve 20 is closed at the end of the purge step in the first phase of the process but valve 62 and/or valve 70 is maintained in the open position. Gas from vessel D now begins to pressurize vessel B. When valve 62 is open, vessel B is countercurrently pressurized, and when valve 70 is open, vessel B is cocurrently pressurized. When both valves 62 and 70 are open, vessel B will be countercurrently and cocurrently pressurized. The extent of pressurization done by gas from vessel D is a matter of choice. Vessel B may be partially pressurized, or fully pressurized to the desired adsorption pressure. The pressure in vessel D determines how high the pressure in vessel B can be raised. During the second phase of this embodiment of the process, vessel A is similarly repressurized by closing valve 18 at the end of the vessel A purge step but keeping valve 60 and/or valve 68 open.

The pressure at which the PSA adsorption step in vessels A and B are carried out is a matter of choice. Typically, the adsorption is carried out at a pressure above about 1 bar, absolute (bara). The upper pressure limit is determined by economics and limitations of the adsorption system, and in general, it is desirably about 20 bara, preferably about 5 bara and most preferably about 3 bara. The pressure at which adsorbent regeneration in vessels A and B is carried out is likewise a matter of choice, and the minimum pressure depends upon whether or not vacuum equipment is used to withdraw purge and desorbed gas from these vessels. Typically, the lower pressure limit during adsorbent regeneration in these vessels can be as low as 0.1 bara, but is preferably not lower than about 0.15 bara, and is most preferably not lower than about 0.2 bara. Adsorbent regeneration may be carried out at pressures as high as 5 bara, but is preferably carried out at pressures not higher than about 2 bara, and most preferably at pressures not above about 1 bara, e.g. atmospheric pressure. The purge step is generally carried out at or just above the pressure to which the vessels are evacuated.

When the process carried out in vessels A and B is TSA, the adsorption and desorption steps will generally be carried out at about the same pressure, although this is not absolutely necessary. As was the case in the PSA process, the purge gas for TSA processes is provided by the auxiliary adsorption system. In TSA processes, it is generally preferred to purge the adsorbent in vessels A and B at pressures slightly above atmospheric pressure. The purge gas can be heated by heating means (not shown) or the adsorbent in vessels A and B can be heated by other heating means, as by electric heaters or steam jackets (not shown). A combination of these two heating procedures may also be employed.

The adsorption step of the auxiliary adsorption process is generally carried out using feed air that is at or above atmospheric pressure. During the adsorption step of the auxiliary adsorption process, valves 38 and 54 are open and valves 42 and 48 are closed, and feed air at the desired pressure is introduced into the vessel C through line 36.

If the auxiliary adsorption system is used solely to supply purge gas to vessels A and B, the adsorption step can be carried out at pressures at or slightly above the pressure at which it is desired to purge vessels A and B. If vessels A and B are purged at pressures below atmospheric pressure, feed air at atmospheric pressure may be drawn into vessel C by means of the vacuum maintained in vessel D. In any event, air entering vessel C passes through the adsorbent in this vessel, and as it does so, nitrogen is adsorbed from the air and oxygen-enriched product gas passes out of vessel C through line 52 and enters product buffer vessel D. As the adsorption step proceeds, the adsorbed nitrogen front in vessel C advances toward the nonadsorbed product gas outlet end of the vessel. When it reaches the desired point in vessel C, the adsorption step is terminated and the adsorbent regeneration step begun. During adsorbent regeneration, vessel C may be vented to the atmosphere or evacuated to subatmospheric pressure. In the former case, valve 48 is open and valve 42 is closed, and in the latter case, valve 48 is closed, valve 42 is open and vacuum pump 44 is activated, and vessel C is evacuated to the desired subatmospheric pressure. Optionally, during adsorbent regeneration, vessel C may be purged with product gas obtained, for example, from vessel D. As indicated above, optimum practice of the auxiliary adsorption process is achieved when nonadsorbed product gas of the desired purity is produced in the main adsorption vessels at the lowest cost. In this respect, venting vessel C to atmospheric pressure or evacuating this vessel with vacuum pump 44 is generally adequate.

When it is desired to regenerate adsorbent in vessels A and B by evacuating these vessels to subatmospheric pressure, this can be accomplished, for example, by sharing a vacuum pump, for example pump 44, with the auxiliary unit. In this case regeneration of the adsorbent in vessel C will have to be coordinated with regeneration of the adsorbent in vessels A and B. Alternatively, separate vacuum pumps can be used for evacuation of vessel C and vessels A and B. When the auxiliary adsorption system comprises two or more adsorption vessels it is generally preferred to use separate feed gas and/or vacuum pumps for the main and auxiliary adsorption systems.

It will be appreciated that it is within the scope of the present invention to utilize conventional equipment to monitor and automatically regulate the flow of gases within the system so that it can be fully automated to run continuously in an efficient manner.

The following Table shows a typical adsorption cycle practiced in the system illustrated in the drawing. In the cycle, the vacuum pump is used to evacuate all of vessels A, B and C. The steps of the process carried out in vessels A and B are pressurization, production, equalization-depressurization, evacuation, purge and equalization-pressurization, and the steps of the process carried out in vessel C are production, use of the product gas from vessel C to purge vessels A and B and evacuation.

TABLE

| | Full Cycle of the Main Process | | | | | |
| --- | --- | --- | --- | --- | --- | --- |
| | First Half-cycle of the Main Process Full Cycle of the Auxiliary Process | | | Second Half-cycle of the Main Process Full Cycle of the Auxiliary process | | |
| Bed A | Equalization | Evacuation | Purge | Equalization | Press. | Production |
| Bed B | Equalization | Press. | Production | Equalization | Evacuation | Purge |
| Bed C | Evacuation | Air Feed | Purge Bed A | Evacuation | Air feed | Purge Bed B |
| Vac. Pump | Evacuate C | Evacuate A | | Evacuate C | Evacuate B | |
| Air Blower | idling | Pressurizes A | | idling | Pressurizes A | |

The invention is further illustrated by the following example in which, unless otherwise indicated, parts, percentages and ratios are on a volume basis.

EXAMPLE

This hypothetical example is based on the cycle illustrated in the Table using the system illustrated in the appended drawing. Assumed conditions are that all three adsorption vessels are the same size, vessels A and B contain a lithium-exchanged zeolite X and vessel C contains sodium-exchanged zeolite X; a total cycle time of 45 seconds, adsorption pressure of 1.1 bara, a regeneration pressure of 0.25 bara, oxygen product purity of 90% from vessels A and B and oxygen product purity of about 50 to about 75% from vessel D, with beds packed with lithium-exchanged type X adsorbent, and the auxiliary unit being fed from ambient air and sharing a vacuum pump with the main unit.

The purge gas is assumed to account for 50% of the product gas produced by vessels A and B; accordingly, since no product gas from vessels A and B is used for purge of the adsorbent in vessels A and B beds, the product will be increased by 100%. Since lower purity purge gas from the auxiliary unit is used to purge the adsorbent in vessels A and B, the purge effectiveness is decreased. At a purge gas purity of 75%, it can be estimated that purge effectiveness decreases by about 25%. This will reduce the product increase estimated above to about 75%.

With all three beds being the same size, the plant total capital, which includes costs of bed fabrication, adsorbent, piping and instrumentation and shipping, will be increased by about 18%. The additional power consumption resulting from operation of vessel C is estimated to be about 20%. Use of the invention increases the product by about 75% at the capital cost increase of about 18% and power cost increase of about 20%.

Although the invention has been described with particular reference to specific equipment arrangements and to specific experiments, these features are merely exemplary of the invention and variations are contemplated. The scope of the invention is limited only by the breadth of the appended claims.

What is claimed is:

1. A method of separating a first gaseous component from a gas mixture comprising said first gaseous component and a second gaseous component comprising the steps:
   (a) subjecting said gas mixture to a cyclic adsorption process comprising adsorption and adsorbent regeneration in at least one main adsorption vessel containing an adsorbent which selectively adsorbs said second gas component from said gas mixture, thereby producing a primary first component-enriched gas product;
   (b) subjecting said gas mixture to a pressure swing adsorption process comprising adsorption and adsorbent regeneration in at least one auxiliary adsorption vessel containing an adsorbent which selectively adsorbs said second gas component, thereby producing a secondary first component-enriched gas product, said pressure swing adsorption process being carried out under conditions such that said secondary first component-enriched gas product is of lower purity, at a lower pressure, or of lower purity and at a lower pressure than said primary first component-enriched gas product; and
   (c) passing said secondary first component-enriched gas product into said at least one main adsorption vessel as a purge gas, as a pressurization gas, or as both a purge gas and a pressurization gas.

2. The process of claim 1, wherein said first component is oxygen and said second component is nitrogen.

3. The process of claim 2, wherein said secondary first component-enriched gas product comprises about 20 to about 95% oxygen.

4. The process of claim 2, wherein said secondary first component-enriched gas product comprises about 50 to about 75% oxygen.

5. The process of claim 1, wherein said first component is nitrogen and said second component is oxygen.

6. The process of claim 2 or claim 5, wherein said gas mixture is air.

7. The process of claim 6, wherein said secondary first component-enriched gas product is of lower purity than said primary first component-enriched gas product.

8. The process of claim 6, wherein said at least one main adsorption vessel and said at least one auxiliary adsorption vessel contain an adsorbent selected from lithium-exchanged type X zeolite, sodium-exchanged type X zeolite, calcium-exchanged type X zeolite, calcium-exchanged type A zeolite and mixtures of these.

9. The process of claim 8, wherein the adsorbent in said at least one main adsorption vessel is different from the adsorbent in said at least one auxiliary adsorption vessel.

10. The process of claim 8, wherein said at least one main adsorption vessel contains lithium-exchanged type X zeolite.

11. The process of claim 10, wherein said at least one auxiliary adsorption vessel contains sodium-exchanged type X zeolite, calcium-exchanged type X zeolite, calcium-exchanged type A zeolite or a mixture of these.

12. The process of claim 1, wherein said cyclic adsorption process is pressure swing adsorption.

13. The process of claim 12, wherein said secondary first component-enriched gas product is at a lower pressure than said primary first component-enriched gas product.

14. The process of claim 12, wherein said secondary first component-enriched gas is introduced countercurrently into said at least one main adsorption vessel as a pressurization gas.

15. The process of claim 1, wherein said cyclic adsorption process is temperature swing adsorption.

16. The process of claim 12 or claim 10, wherein said secondary first component-enriched gas is passed countercurrently through said at least one main adsorption vessel as a purge gas.

17. The process of claim 1, wherein said at least one main adsorption vessel and said at least one auxiliary adsorption vessel contain different adsorbents.

18. The process of claim 1, wherein the adsorption in step (a) is at least partly carried out at a pressure in the range of about 1 to about 20 bara.

19. The process of claim 1, wherein the adsorption in step (a) is at least partly carried out at a pressure in the range of about 1 to about 5 bara.

20. The process of claim 19, wherein the adsorption in step (b) is at least partly carried out at a pressure in the range of about 0.15 to about 2 bara.

21. The process of claim 1, wherein the adsorption in step (b) is at least partly carried out at a pressure in the range of about 0.1 to about 5 bara.

22. Apparatus for separating air by a pressure swing adsorption process comprising:
   (a) at least one main adsorption vessel having an inlet end and a nonadsorbed product outlet end and containing an adsorbent which selectively adsorbs nitrogen from said air;
   (b) at least one auxiliary adsorption vessel having an inlet end and a nonadsorbed product outlet end and containing an adsorbent which selectively adsorbs nitrogen from said air, the adsorbent in said at least one main adsorption vessel being different from the adsorbent in said at least one auxiliary vessel;
   (c) means for introducing said air into said at least one main adsorption vessel at its inlet end;
   (d) means for introducing said air into said at least one auxiliary adsorption vessel at its inlet end at a lower pressure than said air being introduced into said at least one main adsorption vessel;
   (e) means for withdrawing oxygen-enriched product gas from said at least one main adsorption vessel at its nonadsorbed outlet end;
   (f) means for withdrawing oxygen-enriched product gas from said at least one auxiliary adsorption vessel at its nonadsorbed product end and introducing such oxygen-enriched product gas into said at least one main adsorption vessel at its nonadsorbed product end as purge gas; and
   (g) means for withdrawing desorbed nitrogen-enriched gas mixture from said at least one main adsorption vessel at its inlet end.

23. The apparatus of claim 22, wherein said adsorbent in said at least one main adsorption vessel and said adsorbent in said at least one auxiliary vessel is selected from lithium-exchanged type X zeolite, calcium-exchanged type X zeolite, calcium-exchanged type A zeolite, sodium-exchanged type X zeolite and mixtures of these.

24. The apparatus of claim 22, wherein said means for introducing said air into said at least one auxiliary adsorption vessel provides said air at a pressure lower than the pressure of said air provided by means (c).

* * * * *